US010035237B2

(12) United States Patent
Panergo et al.

(10) Patent No.: US 10,035,237 B2
(45) Date of Patent: Jul. 31, 2018

(54) ROBOTIC END EFFECTOR INCLUDING MULTIPLE ABRASION TOOLS

(75) Inventors: Reynold R. Panergo, Lynnwood, WA (US); James C. Vanavery, Renton, WA (US)

(73) Assignee: The Boeing Company, Chicago, IL (US)

( * ) Notice: Subject to any disclaimer, the term of this patent is extended or adjusted under 35 U.S.C. 154(b) by 1796 days.

(21) Appl. No.: 13/288,024

(22) Filed: Nov. 2, 2011

(65) Prior Publication Data
US 2013/0109277 A1 May 2, 2013

(51) Int. Cl.
| | |
|---|---|
| *B24B 51/00* | (2006.01) |
| *B24B 19/26* | (2006.01) |
| *B24B 27/00* | (2006.01) |
| *B24B 41/00* | (2006.01) |
| *B24B 41/04* | (2006.01) |
| *B25J 11/00* | (2006.01) |
| *B24B 1/00* | (2006.01) |

(52) U.S. Cl.
CPC ............ *B24B 19/26* (2013.01); *B24B 1/00* (2013.01); *B24B 27/0015* (2013.01); *B24B 27/0076* (2013.01); *B24B 41/002* (2013.01); *B24B 41/005* (2013.01); *B24B 41/04* (2013.01); *B25J 11/0065* (2013.01)

(58) Field of Classification Search
CPC ..... B24B 19/26; B24B 27/0038; B24B 23/03; B24B 1/00; B24B 27/0015; B24B 27/0076; B24B 41/002; B24B 41/005; B24B 41/04; B25J 11/0065
USPC ............ 451/5, 9, 10, 11, 357, 359, 270, 271
See application file for complete search history.

(56) References Cited

U.S. PATENT DOCUMENTS

| | | | | |
|---|---|---|---|---|
| 136,875 | A | | 3/1873 | Stearns |
| 1,368,752 | A | * | 2/1921 | Rauworth ..................... 451/174 |
| 2,759,305 | A | * | 8/1956 | Helbig ......................... 451/356 |
| 4,712,289 | A | * | 12/1987 | Stamm et al. .................. 483/13 |
| 5,138,800 | A | * | 8/1992 | Janusz ............................. 451/5 |
| 5,161,331 | A | * | 11/1992 | Zambon ....................... 451/159 |
| 5,231,803 | A | * | 8/1993 | Lanzer ........................... 451/28 |
| 5,248,341 | A | * | 9/1993 | Berry et al. .................. 118/698 |
| 5,377,455 | A | * | 1/1995 | Lanzer ............................. 451/5 |
| 5,377,566 | A | | 1/1995 | Mandigo |
| 5,482,496 | A | * | 1/1996 | Lanzer ............................. 451/5 |
| 5,607,343 | A | | 3/1997 | Keith, Jr. |
| 5,987,217 | A | * | 11/1999 | Wisniewski et al. ......... 700/245 |
| 6,086,457 | A | * | 7/2000 | Perlov et al. .................. 451/41 |
| 6,193,337 | B1 | | 2/2001 | Roeker |
| 6,312,316 | B1 | * | 11/2001 | Takahashi et al. ............. 451/41 |

(Continued)

FOREIGN PATENT DOCUMENTS

| | | | |
|---|---|---|---|
| DE | 2645405 | A | 4/1977 |
| DE | 2645405 | A1 * | 4/1977 |

(Continued)

OTHER PUBLICATIONS

DE 2645405A1 English Machine Translation.*

(Continued)

*Primary Examiner* — Marc Carlson
(74) *Attorney, Agent, or Firm* — Miller, Matthias & Hull LLP

(57) ABSTRACT

A robot system comprises a robotic end effector including first, second and third abrasion tools having backing pads in a triangular arrangement.

20 Claims, 7 Drawing Sheets

(56) References Cited

U.S. PATENT DOCUMENTS

| | | | |
|---|---|---|---|
| 6,352,227 B1* | 3/2002 | Hathaway | 248/160 |
| 6,425,169 B1* | 7/2002 | Briscoe | 29/90.01 |
| 6,672,945 B1* | 1/2004 | Matsuo et al. | 451/56 |
| 6,855,032 B1* | 2/2005 | Yang et al. | 451/5 |
| 6,921,317 B2* | 7/2005 | Wood et al. | 451/5 |
| 7,022,004 B2* | 4/2006 | Bohler | 451/366 |
| 7,118,452 B2* | 10/2006 | Wood | 451/11 |
| 7,144,313 B1 | 12/2006 | Greenwood | |
| 7,252,577 B2* | 8/2007 | Wood | 451/41 |
| 7,427,228 B1* | 9/2008 | Kirsch | 451/357 |
| 8,051,796 B2* | 11/2011 | Clifford | 118/323 |
| 8,251,780 B2* | 8/2012 | Ward et al. | 451/353 |
| 8,328,600 B2* | 12/2012 | Duescher | 451/11 |
| 8,366,518 B2* | 2/2013 | Bailey | 451/357 |
| 8,647,172 B2* | 2/2014 | Duescher | 451/11 |
| 2002/0072297 A1 | 6/2002 | Kennerknecht et al. | 451/5 |
| 2002/0173226 A1* | 11/2002 | Carlson, III | 451/5 |
| 2003/0045208 A1* | 3/2003 | Neidrich et al. | 451/8 |
| 2004/0082285 A1* | 4/2004 | Bohler | 451/359 |
| 2004/0102136 A1* | 5/2004 | Wood et al. | 451/5 |
| 2004/0102140 A1* | 5/2004 | Wood et al. | 451/41 |
| 2004/0132392 A1* | 7/2004 | Bohler | 451/360 |
| 2004/0203326 A1* | 10/2004 | Lischka | 451/72 |
| 2005/0070210 A1* | 3/2005 | Jeong | 451/8 |
| 2005/0181707 A1* | 8/2005 | Wood | 451/11 |
| 2005/0282472 A1* | 12/2005 | Jeong | 451/41 |
| 2006/0194528 A1* | 8/2006 | Rawlins et al. | 451/353 |
| 2007/0042677 A1* | 2/2007 | Wood | 451/5 |
| 2008/0032603 A1* | 2/2008 | Manor | 451/11 |
| 2008/0057842 A1* | 3/2008 | Lampka et al. | 451/357 |
| 2011/0183586 A1* | 7/2011 | Lehman | 451/357 |
| 2012/0142255 A1* | 6/2012 | Panergo et al. | 451/28 |
| 2012/0220194 A1* | 8/2012 | Maloney et al. | 451/5 |
| 2013/0090038 A1* | 4/2013 | Duescher | 451/5 |
| 2013/0090039 A1* | 4/2013 | Duescher | 451/5 |

FOREIGN PATENT DOCUMENTS

| | | |
|---|---|---|
| DE | 20318660 | 2/2004 |
| DE | 20318660 U1 * | 2/2004 |
| WO | WO 9114539 A1 * | 10/1991 |
| WO | WO9114539 A1 | 10/1991 |

OTHER PUBLICATIONS

DE 20318660U1 English Machine Translation.*
Nagata et al., "Robotic sanding system for new designed furniture with free-formed surface," Robotics and Computer-Integrated Manufacturing 23, pp. 371-379 (2007).
Ryuh et al, "An automatic tool changer and integrated software for a robotic die polishing station", Mechanism and Machine Theory, Pergamon, Amsterdam, NL, vol. 41, No. 4, Apr. 1, 2006 (Apr. 1, 2006), pp. 415-432.

* cited by examiner

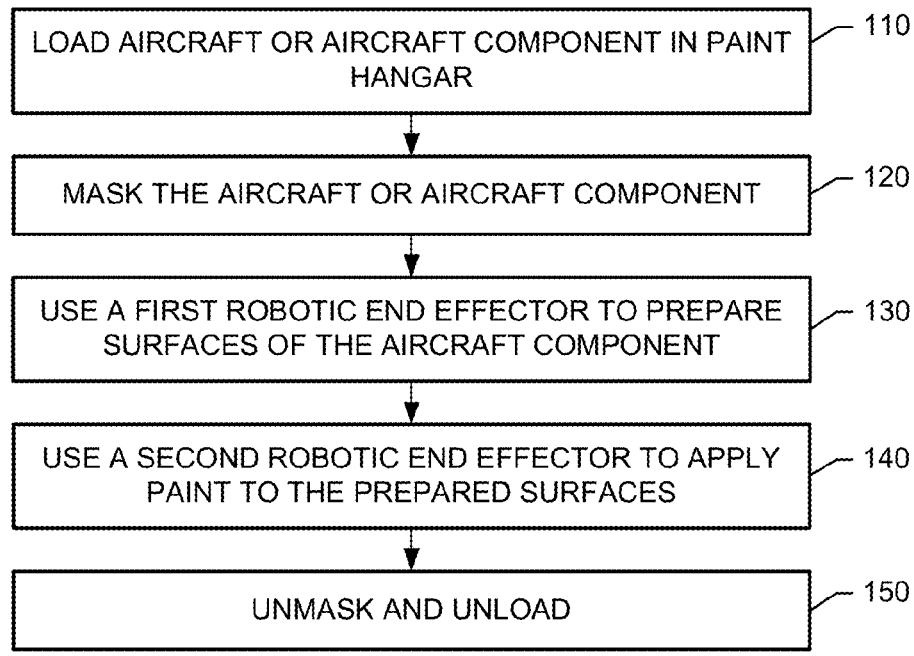
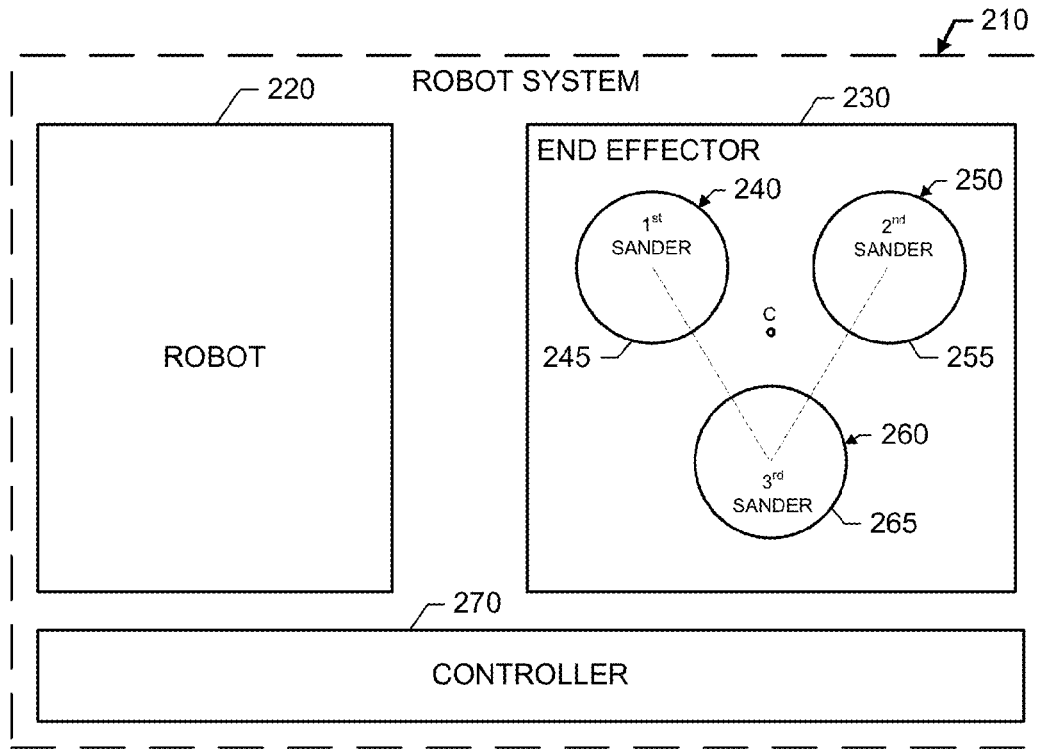

ROBOTIC END EFFECTOR INCLUDING MULTIPLE ABRASION TOOLS

BACKGROUND

Paint systems may be applied to exterior surfaces of commercial aircraft. Typically, surface preparation is performed on bare or primed surfaces, and then primer, base coat and decorative coat are applied.

The surface preparation may be performed manually. However, manual surface preparation such as sanding poses human health hazards such as dust inhalation and poor ergonomics.

These hazards can be avoided by a robot system that autonomously performs surface preparation. In addition to avoiding human health hazards, the robot system can provide a more consistent process than manual surface preparation.

The following features for a robot system would be desirable: the ability to (1) cover a surface rapidly, yet maintain a high quality surface finish; (2) maintain consistent stroke or path patterns; and (3) maintain constant force with different tool orientations. This last feature is especially desirable with respect to commercial aircraft.

It would also be desirable for the robot system to satisfy these objectives with respect to large open surface areas and small restricted areas on a commercial aircraft. (A commercial aircraft fuselage typically has large open surface areas above and below windows and doors, and small restricted areas between windows.) It would be desirable for a robot system to move from nose to tail while performing surface preparation on both the larger open surface areas and the smaller restricted areas without having to change end effector tools.

SUMMARY

According to an embodiment herein, a method comprises using a robotic end effector to perform surface preparation on a surface of an aircraft component. The end effector includes first, second and third abrasion tools having their backing pads in a triangular arrangement.

According to another embodiment herein, a robot system comprises a robotic end effector including first, second and third abrasion tools having backing pads arranged in a triangular arrangement.

According to another embodiment herein, a system comprises a multi-axis robot and an end effector including first, second and third random orbital abrasion tools in a triangular arrangement. The abrasion tools are selectively retractable, extendable and operable.

The features and functions may be achieved independently in various embodiments or may be combined in other embodiments, further details of which can be seen with reference to the following description and drawings.

BRIEF DESCRIPTION OF THE DRAWINGS

FIG. 1 is an illustration of a basic method of applying a paint system to a commercial aircraft.

FIG. 2 is an illustration of a robot system including an end effector for performing surface preparation.

DETAILED DESCRIPTION

Figure 3:
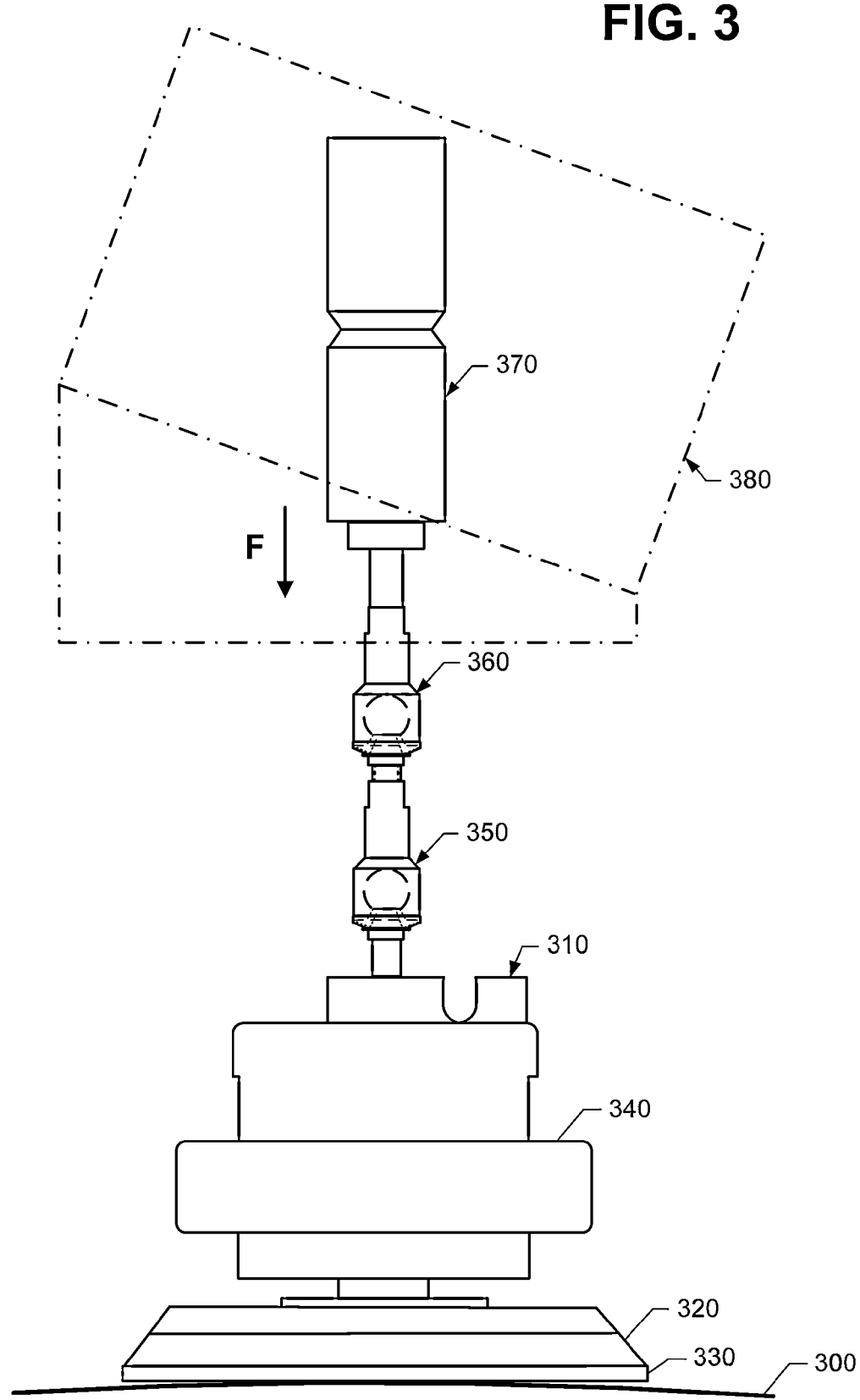
FIG. 3 is an illustration of a random orbital abrasion tool and serial ball joints.

Reference is made to FIG. 1, which illustrates a basic method of applying a paint system to one or more components of a commercial aircraft. The components may be major components such as the fuselage, wing assemblies and empennage, or they may be smaller components.

At block 110, the aircraft or aircraft component is loaded in a paint hangar or booth. In some embodiments, the paint hangar may be a class 1 division 1 (C1D1) location having the area of a football field. A C1D1 location refers to a location in which ignitable concentrations of gases or vapors may exist. A tug may be used to move the entire aircraft into the hangar or a forklift truck may be used to move a component into the hangar.

At block 120, the aircraft or component is masked. Wet chemical cleaning may be performed on the surfaces to be painted.

At block 130, a robot system is used to prepare surfaces of the aircraft component. The surface preparation may include, without limitation, surface abrasion and sanding. Surface preparation as described herein is performed with a robotic end effector including first, second and third random orbital abrasion tools having backing pads arranged in a triangular arrangement. The type of surface preparation (e.g., sanding) is determined by the type of media attached to the backing pads.

The surfaces may be bare composite or metal, or the surfaces may have already been primed. If the surface is already primed, the primed surface may be sanded to reactivate the primer. Then a new layer of primer may be applied and cured. If the surface is bare, the abrasion tools may use abrasive material (e.g., unwoven pads) to clean the surfaces of debris or contaminants. An adhesion promoter and primer are then applied. The primer is then cured.

At block 140, a second robotic end effector is used to paint the prepared surfaces. At block 150, the aircraft or aircraft component is unmasked and unloaded.

In addition to avoiding human health hazards and providing a more consistent process, a robot system herein may be moved from nose to tail while preparing both the larger open surface areas and the smaller restricted areas, without having to change end effector tools.

Reference is now made to FIG. 2, which illustrates a system 210 including a robot 220 and an end effector 230 for performing surface preparation. The end effector 230 includes a first abrasion tool 240 having a first backing pad 245, a second abrasion tool 250 having a second backing pad 255, and a third abrasion tool 260 having a third backing pad 265. The backing pads 245, 255 and 265 have a triangular arrangement. For example, nominal centers of the backing pads 245, 255 and 265 correspond to vertices of an equilateral triangle.

The triangular arrangement allows the system 210 to cover large surface areas. It also provides overlapping surface coverage, which reduces the need to perform surface preparation multiple times.

The abrasion tools 240, 250 and 260 are rotatable as a group about an axis C. Each abrasion tool 240, 250 and 260 may also be independently retracted and extended. The abrasion tools 240, 250 and 260 are independently operable. This combination of features allows the system 210 to adapt from covering large areas to covering smaller areas. For instance, doors, windows, lap joins, and section joins requires edge sanding which can be performed with one or two of the abrasion tools 240, 250 and 260. The combination of rotation and retraction also enables the end effector 230 to follow a single straight path (vertical or horizontal), which simplifies the programming of the robot 220.

In some embodiments, all three abrasion tools 240, 250 and 260 may be random orbital abrasion tools. Each random orbital abrasion tool 240, 250 and 260 produces a random orbit by simultaneously spinning its backing pad and moving its backing pad in an elliptical path, which ensures that no single part of abrasive material travels the same path twice. Because of this unique random orbital action, the random orbital abrasion tool produces a better surface finish than jitterbug sanders and other types of sanders.

In other embodiments, however the abrasion tools 240, 250 and 260 may include a combination of random orbital tools and other tools. For instance, these other embodiments may include a combination of a random orbital sander, another type of orbital sander, and a jitterbug sander.

If the system 210 is intended for a C1D1 location, the abrasion tools 240, 250 and 260 may be driven pneumatically to avoid sparking. As for the robot 220, it may be a C1D1 robot.

Limiting the number of abrasion tools to three is ideal for pneumatic power. The three abrasion tools 240, 250 and 260 maintain a relatively low payload. In addition, more than three abrasion tools would require a larger supply or volume of air and would increase the weight significantly. Weight becomes a factor when dealing with paint robots that have low payloads. Exceeding payload limits can cause the robot 220 to fault out or produce unstable motions.

The surface preparation may include, but is not limited to, sanding, abrading, polishing, and scrubbing. Examples of the surface preparation media include, but are not limited to sand paper, unwoven abrasive pads, and polishing media. The surface preparation media is attached to the backing pads 245, 255 and 265. In some embodiments, the abrasion tools 240, 250 and 260 may have backing pads of different sizes and use media of different types.

The robot system 210 further includes a controller 270 for controlling the robot 210 to move the end effector 230 to a desired position and orientation. The controller 270 also commands the end effector 230 to operate in a desired manner. The controller 270 may be processor-based.

Multiple systems 210 may be used at the same time on a commercial aircraft. For instance, at least eight systems 210 may perform surface preparation at the same time on a wide body aircraft.

Reference is now made to FIG. 3, which illustrates a random orbital abrasion tool 310. The abrasion tool 310 includes a backing pad 320 and a surface preparation medium 330 (e.g., a sanding disc) secured to the backing pad 320. The abrasion tool 310 further includes a motor 340 for spinning the backing pad 320 and simultaneously moving the backing pad 320 in a elliptical path.

A first ball joint 350 is connected to the abrasion tool 310, a second ball joint 360 is serially connected to the first ball joint 350, and a linear actuator 370 is serially connected to the second ball joint 360. The linear actuator 370 is secured to a body 380 of the robotic end effector.

During operation, the linear actuator 370 applies a constant force to the serial connection of first and second ball joints 350 and 360 in the direction of the arrow F. The ball joints 350 and 360, in turn, transmit the force to the abrasion tool 310. The force presses the backing pad 320 and surface preparation medium 330 against an aircraft surface 300, while the motor 340 spins the medium 330 and moves the medium 330 in an elliptical path against the surface 300.

Each ball joint 350 and 360 includes first and second rod ends coupled with a spherical interface that is allowed a swivel of up to angle δ. In some embodiments, δ=35 degrees.

Surface preparation with random orbital abrasion tools produces a better surface finish than with other types of abrasion tools, provided that the medium 330 stays normal to the surface 300. However, random orbital abrasion tools are prone to chattering. The chattering can cause uncontrolled patterns or removal during sanding, which can result in a non-uniform finish.

The serially-connected ball joints 350 and 360 provide an unexpected result: they prevent the abrasion tool 310 from chattering during operation. The two ball joints 350 and 360 allow for motion in the horizontal direction with an applied downward force applied at the top of the abrasion tool 310 and centered.

By preventing chattering, the abrasion tool 310 stays normal to the surface 300. Moreover, uncontrolled patterns or removal during surface preparation are avoided. This is beneficial for a single random orbital abrasion tool is desirable. It is especially beneficial for end effectors that utilize three random orbital abrasion tools.

In some embodiments, the linear actuator 370 includes a pneumatic double compression cylinder connected to the second ball joint 360. The compression cylinder provides a linear force using compressed air. The compression cylinder is rigid in the direction of pad motion. A double acting compression cylinder is advantageous because the pressure stays constant throughout the entire stroke. In contrast, in a single acting cylinder, the force will change based on the displacement of an internal spring.

Figure 4:
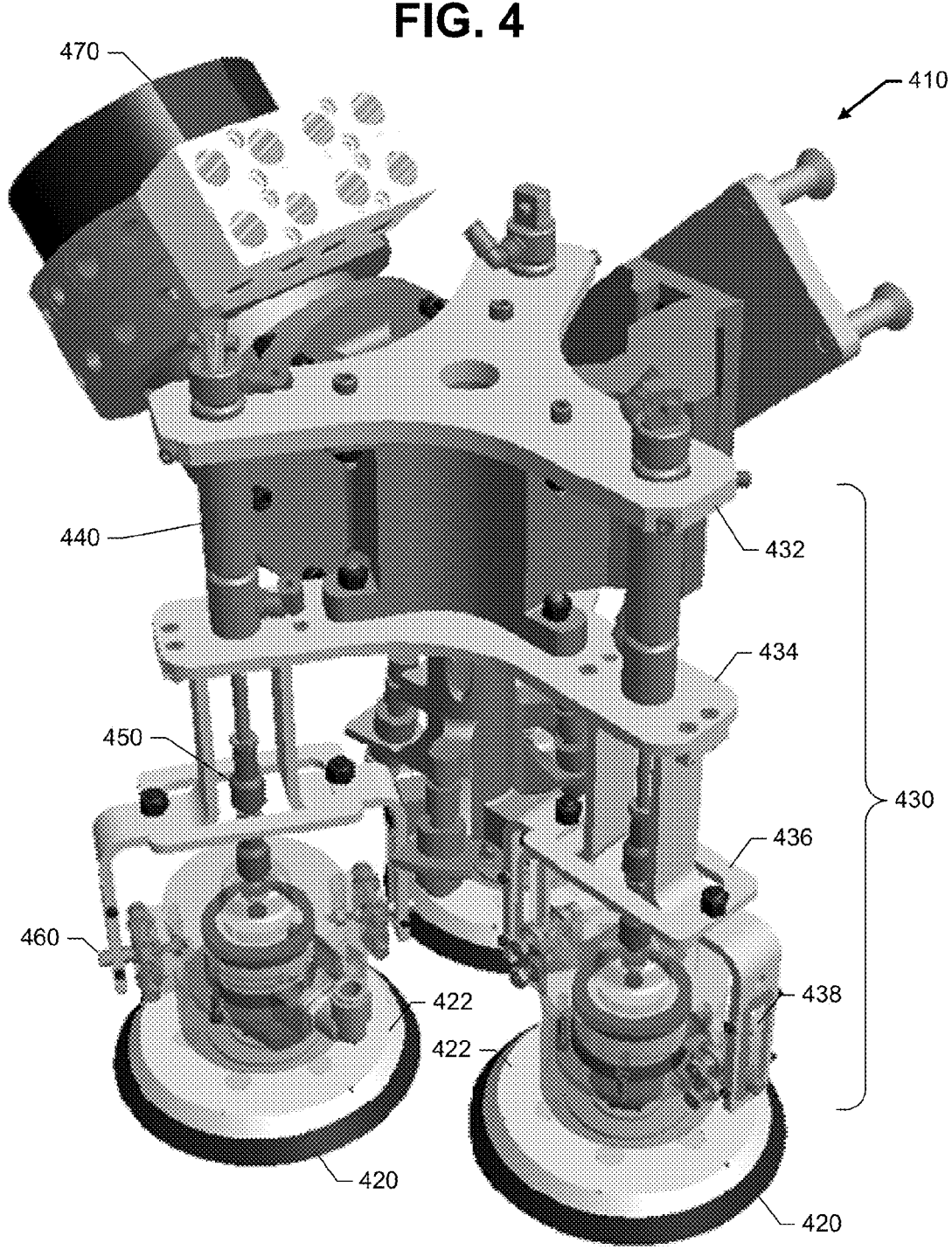
FIG. 4 is an illustration of a robotic end effector including three random orbital abrasion tools for performing surface preparation.

Reference is now made to FIG. 4, which illustrates a specific example of an end effector 410 including first, second and third random orbital abrasion tools 420 supported by an end effector body 430. The body 430 holds the abrasion tools 420 so their backing pads 422 are in a triangular arrangement.

The end effector body 430 includes spaced-apart upper and lower plates 432 and 434. These plates 432 and 434 carry three pneumatic double compression cylinders 440. The body 430 further includes three brackets 436 suspended from the lower plate 434. Each bracket 436 is located beneath a corresponding pneumatic cylinder 440. Each bracket 436 supports an abrasion tool 420 and serially-connected ball joints 450. Each upper ball joint is connected to its corresponding pneumatic cylinder 440. Each bracket 436 includes slots 438 for allowing its abrasion tool 420 to be moved up and down (retracted and extended) by its corresponding pneumatic cylinder 440. Guide pins 460 may be used to limit the range of retraction/extension and also prevent the abrasion tool 420 from rotating.

Figure 5:
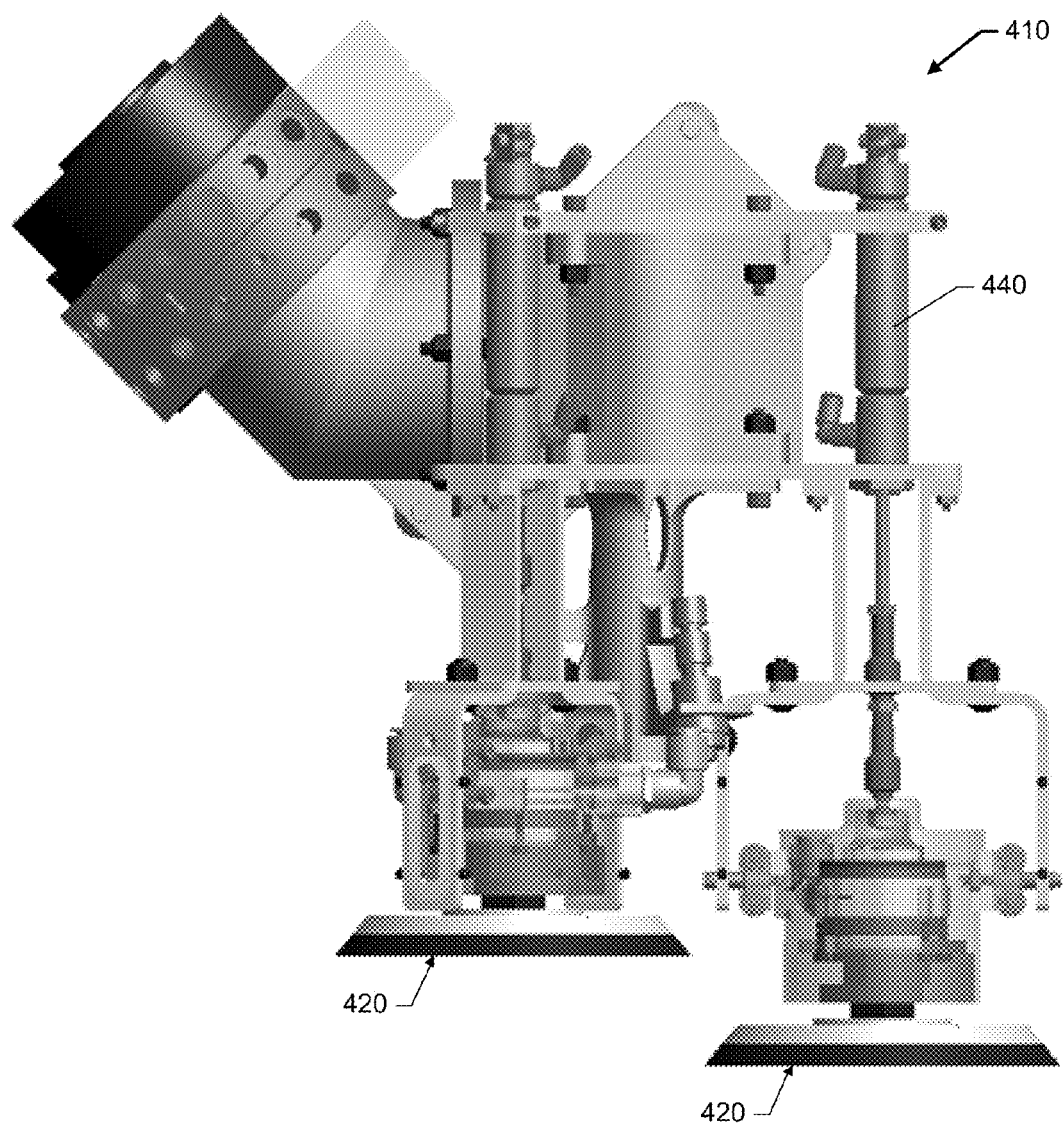
FIG. 5 is an illustration of the end effector of FIG. 4 with one abrasion tool extended.

Additional reference is made to FIG. 5. The abrasion tools 420 and the pneumatic cylinders 440 are independently operable, whereby one or two abrasion tools 420 may be retracted and the remaining abrasion tool(s) 420 extended to perform surface preparation (FIG. 5 shows one abrasion tool 420 extended). By retracting one or two of the abrasion tools 420 and operating only the extended abrasion tool(s) 420, the end effector 410 is configured to prepare smaller surface areas. By extending and operating all three abrasion tools 420, that same end effector 410 is configured to prepare large open surface areas.

Reference is made once again to FIG. 4, which shows gaps between the backing pads 422 of the abrasion tools 420. The serial ball joints 450 allow for lateral motion of the abrasion tools 420. These gaps allow the abrasion tools 420 to operate without their backing pads 422 bumping into each other.

Pressure transducers (not shown) regulate compressed air to enable the pneumatic cylinders 440 to apply constant force regardless of orientation. For instance, these transducers allow the end effector 410 to be oriented upside down, yet still enable the abrasion tools 420 to apply the same force as those that are right-side up. The transducers may regulate input pressure via a DC voltage. The transducers may be housed in the controller 270 (which is shown in FIG. 2).

Figure 6:
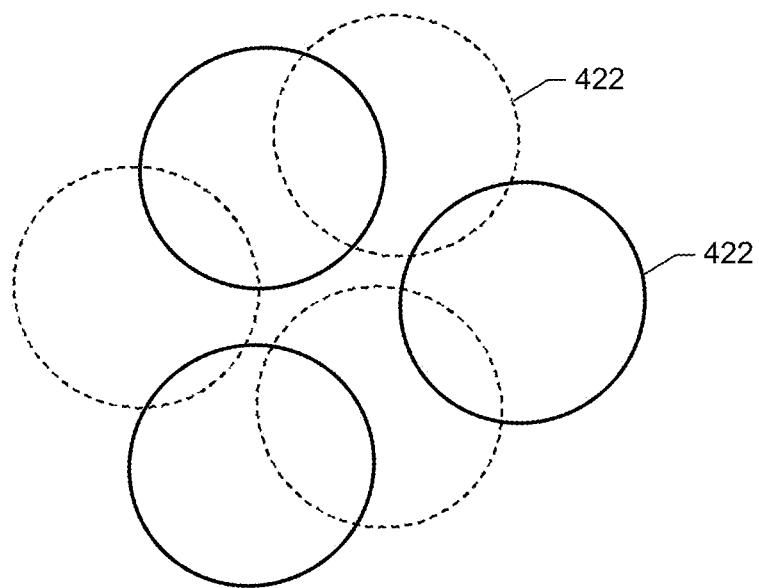
FIG. 6 is an illustration of two orientations of abrasion tool backing pads.

The combination of the compression cylinders 440 and the triangular arrangement of backing pads 422 enables the end effector 410 to maintain consistent stroke or path patterns. The robot has a limited range of motion. To maintain the same path pattern as it approaches its limits, the robot adjusts its motion by rotation of the end effector 410. The three backing pads 422 allow 120 degree changes without changing the path pattern. See FIG. 6, which shows a first backing pad orientation in solid and a rotated pattern in dash.

FIG. 4 also shows an embodiment of a robot that uses a robotic wrist 470. The wrist 470, which is attached to the upper plate 432, can position the pneumatic cylinders 440 at different orientations (e.g., 0, 30, 45, and 90 degrees). A wrist 470 such as a spherical wrist enables three degrees of freedom.

Some embodiments of the robot may also include an x-y-z positioning system (not shown in FIG. 4). When the x-y-z positioning system is combined with the robotic wrist 470, the robot has six degrees of freedom for positioning the end effector with respect to a surface of an aircraft.

The robot may have additional degrees of freedom. For example, the robot may include a rail system for movement along the length of the aircraft (e.g., between nose and tail).

The robot may also include a robotic arm for moving the end effector 410 vertically. The arm may have a length that enables the end effector 410 to reach the belly and crown of the aircraft.

Figure 7:
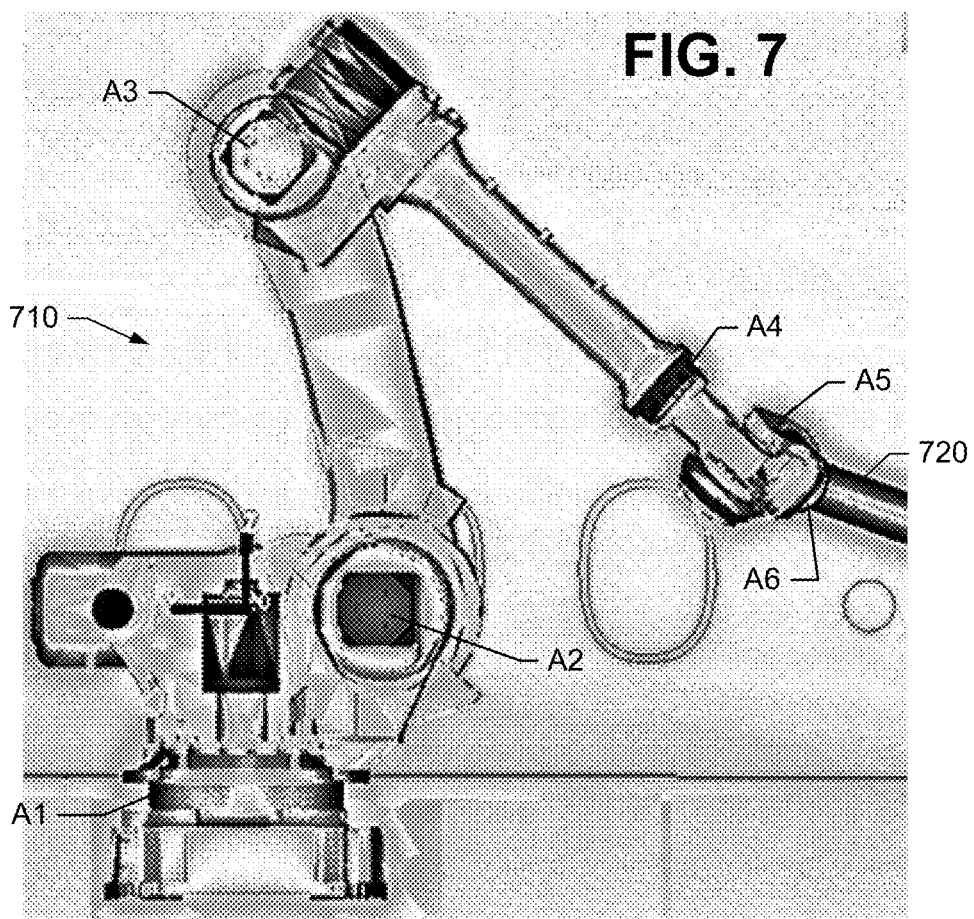
FIG. 7 is an illustration of a multi-axis robot.

Reference is now made to FIG. 7, which illustrates a six-axis robot 710 including a robotic arm 720. The arm 720 may extend from the robotic wrist 460. The axes are labeled A1 to A6.

Figure 8:
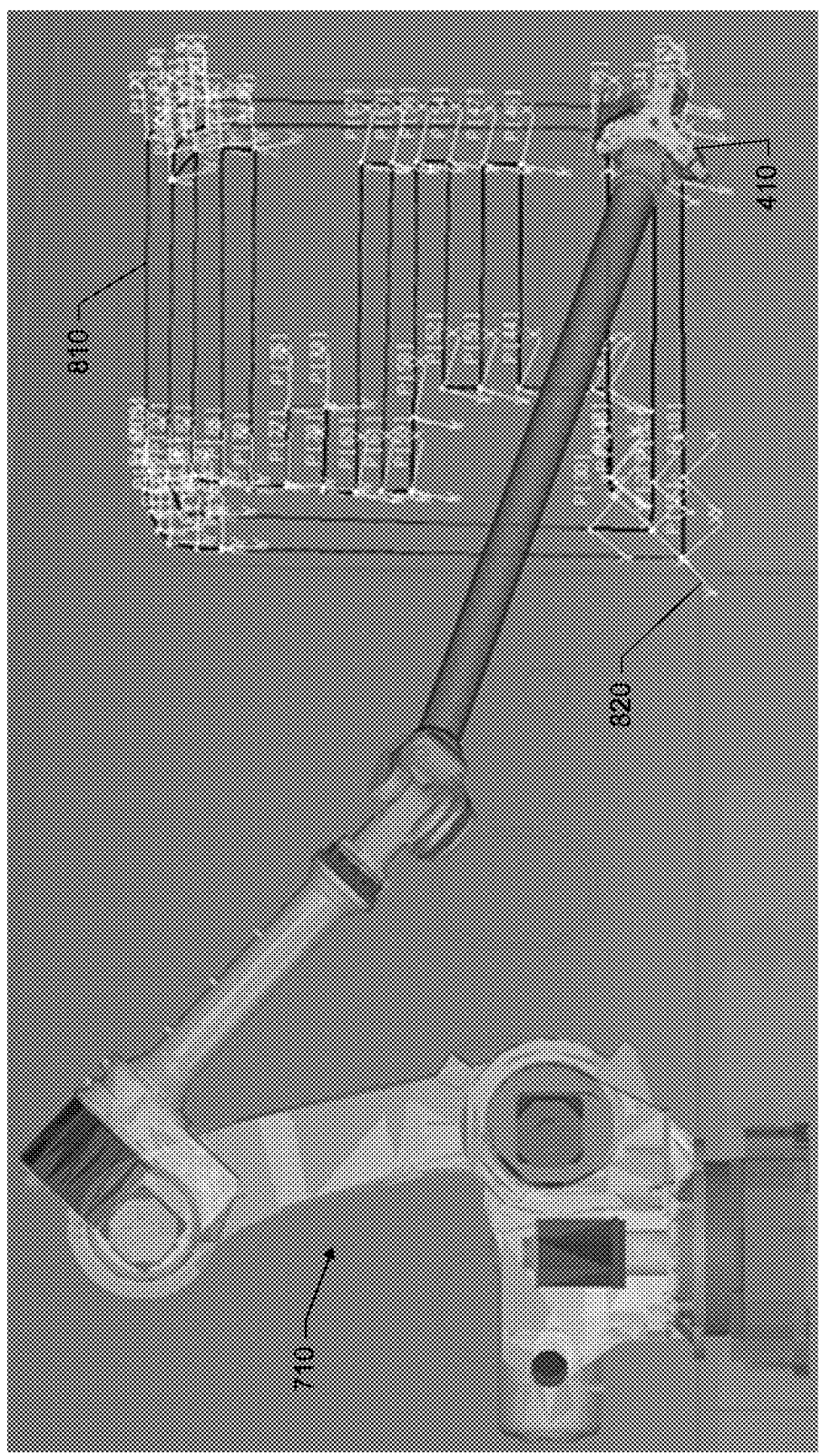
FIG. 8 is an illustration of robot and end effector paths for surface preparation on an aircraft fuselage.

FIG. 8 illustrates a pattern for preparing a restricted surface such as a door. The black lines 810 represent a programmed path that the end effector 410 may follow when moving across the surface. The pattern is essentially serpentine. The robot 710 is at the center of the path.

The white axes 820 represent the points to which the robot 710 travels. The robot motion may be based on point to point movements. As can be seen, the orientations of the axes 820 are not all equal. This is because the robot 710 needs to maneuver around the restricted surface area and also because the robot 710 has axis limits on its joints; thus, it is unable to maintain the same orientation at its farthest reach. The combination of rotation and retraction allows the end effector 410 to reach the furthest points.

For large open areas, the robot 710 may move the end effector 410 in vertical or horizontal strokes. There may be an overlap depending on film thickness (a thicker coat might require additional abrasion) and the type of abrasion that is used.

Figure 9:
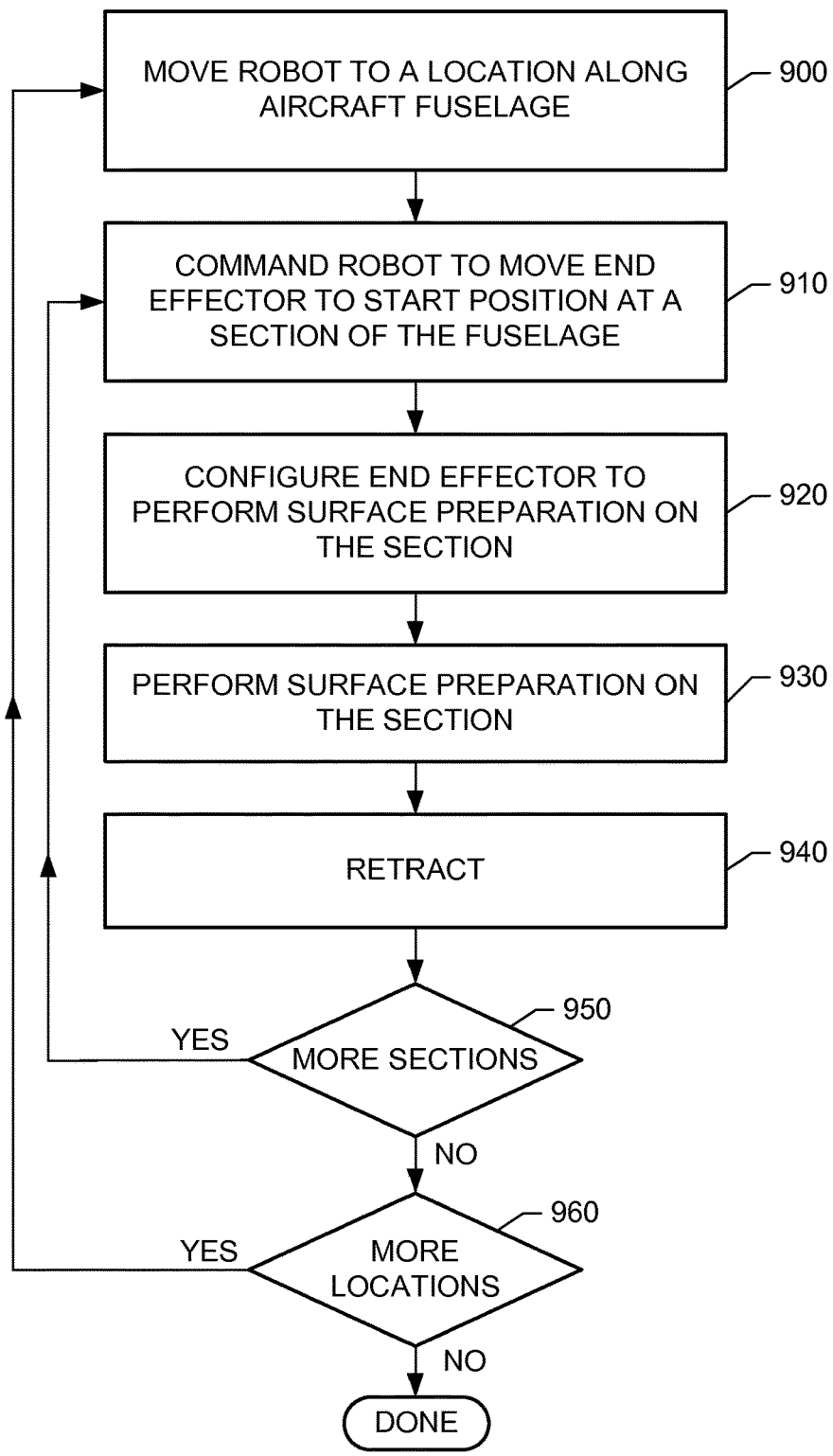
FIG. 9 is an illustration of a method of using a robot system to perform surface preparation on an aircraft fuselage.

Reference is now made to FIG. 9, which illustrates a method of operating the robot system during surface preparation on an aircraft fuselage. Because the fuselage has such a large surface, surface preparation may be performed in sections. Each section may be based on the reach capability of the robot system.

At block 900, the robot is moved to a location along the fuselage. A starting location might be the nose of the fuselage. The robot may be moved by a rail system or transport vehicle. At the location, several sections of the fuselage may be within reach of the robot system.

At block 910, the robot moves the end effector to a start position of a section of the fuselage. At block 920, the end effector is configured to perform surface preparation on that section. Configuring the end effector may include setting its pressure based on location of the fuselage and then extending one or more of the abrasion tools. If the area is large, all three abrasion tools will be extended. If the area is smaller, only one or two abrasion tools will be extended. Pressure settings may take gravity into account. Consider the preparation of an aircraft's belly and crown. During preparation of the belly, the end effector is below the belly and gravity pulls the end effector away from the belly. During preparation of the crown, the end effector is above the crown, and gravity pulls the end effector into the crown. The pressure settings enable the same constant force to be applied to the belly of the fuselage and to the crown.

At block 930, the extended abrasion tools are actuated and moved in a pattern over the section. Surface preparation on that section is performed.

At block 940, once the surface preparation on that section has been completed, the abrasion tools are retracted. If an additional section at that location requires preparation (block 950), the robot moves the end effector to a different section within its reach (block 910). If all sections have been prepared (block 950) but additional locations remain (block 960), the robot is moved to a different location for further work (block 900).

This process may be repeated until surface preparation on the fuselage has been completed (block 960). In this manner, surface preparation of the fuselage may be performed from nose to tail with the robot being moved in essentially a straight path without having to change end effector tools. The surface preparation is performed quickly with an excellent finish.

The invention claimed is:

1. A method comprising using a robotic end effector to perform surface preparation on a surface of an aircraft fuselage, the end effector including first, second and third abrasion tools having their backing pads in a triangular arrangement, the surface preparation including selectively extending, retracting and operating the abrasion tools and rotating the abrasion tools as a group as the end effector is moved in a relatively straight path along the fuselage from tail to nose without having to change the abrasion tools.

2. The method of claim 1, wherein edge sanding is performed by selectively retracting, extending, operating, and rotating the abrasion tools.

3. The method of claim 2, wherein the edge sanding is performed at doors, windows and joins in the fuselage.

4. The method of claim 1, further comprising applying a constant pressure to the abrasion tools through serially-connected ball joints.

5. A robot system comprising a robotic end effector including first, second and third abrasion tools having backing pads arranged in a triangular arrangement about an axis of rotation, wherein the abrasion tools are rotatable as a group about the axis, and each abrasion tool is selectively operable, retractable and extendable.

6. The system of claim 5, wherein nominal centers of the backing pads form an equilateral triangle.

7. The system of claim 5, wherein the end effector further includes an actuator for each abrasion tool, each actuator independently operable to selectively extend and retract its corresponding abrasion tool.

8. The system of claim 5, wherein the abrasion tools are random orbital abrasion tools.

9. The system of claim 5, wherein the backing pads have an overlapping relationship.

10. The system of claim 5, further comprising a ball joint assembly for each abrasion tool, each ball joint assembly including a first ball joint connected to its corresponding abrasion tool, and a second ball joint connected between the first ball joint and the robotic end effector.

11. The system of claim 7, wherein each actuator is operable to selectively withdraw its abrasion tool from surface preparation and selectively return its abrasion tool for surface preparation.

12. The system of claim 10, wherein each ball joint assembly further includes a linear actuator, connected to the second ball joint, for applying constant pressure to its corresponding abrasion tool.

13. The system of claim 12, wherein the linear actuator includes a pneumatic double compression cylinder and a pressure regulator for regulating pressure in the cylinder so a constant force is applied to its corresponding abrasion tool.

14. The system of claim 5, further comprising a robot having at least six axes for positioning and orienting the end effector.

15. The system of claim 14, wherein the robot includes a robot arm and a wrist.

16. A system comprising:
a multi-axis robot; and
an end effector including first, second and third random orbital abrasion tools in a triangular arrangement, the abrasion tools selectively retractable, extendable and operable; ball joint assemblies coupled to the abrasion tools; linear actuators connected to the ball joint assemblies; and pressure transducers for regulating the linear actuators to apply constant pressure to the abrasion tools regardless of orientation of the end effector.

17. The system of claim 16, wherein the multi-axis robot includes a wrist and an arm between the wrist and the end effector.

18. The system of claim 17, wherein the multi-axis robot is a six-axis robot.

19. The system of claim 16, each ball joint assembly including a first ball joint connected to its corresponding abrasion tool, and a second ball joint connected between the first ball joint and its corresponding linear actuator.

20. The system of claim 19, wherein the abrasion tools are arranged about an axis of rotation, and wherein the abrasions tools are rotatable as a group about the axis.

* * * * *